US012695369B2

(12) United States Patent
Chen et al.

(10) Patent No.: US 12,695,369 B2
(45) Date of Patent: Jul. 28, 2026

(54) SWITCHING MODE POWER CONVERTER WITH PULSE SKIPPING AND CONTROL METHOD THEREOF

(71) Applicant: Diodes Incoporated, Plano, TX (US)

(72) Inventors: Hao-Ming Chen, New Taipei City (TW); Adrian Wang, Plano, TX (US); Ko-Yen Lee, New Taipei City (TW); Feng-Jung Huang, New Taipei City (TW); Kuo-Yung Yu, New Taipei City (TW); Wei Chih Chen, New Taipei City (TW)

(73) Assignee: Diodes Incorporated, Plano, TX (US)

( * ) Notice: Subject to any disclaimer, the term of this patent is extended or adjusted under 35 U.S.C. 154(b) by 342 days.

(21) Appl. No.: 18/533,032

(22) Filed: Dec. 7, 2023

(65) Prior Publication Data

US 2025/0192666 A1     Jun. 12, 2025

(51) Int. Cl.
  *H02M 1/00*      (2006.01)
  *H02M 3/156*     (2006.01)
(52) U.S. Cl.
  CPC ....... *H02M 1/0032* (2021.05); *H02M 1/0025* (2021.05); *H02M 1/0041* (2021.05); *H02M 3/156* (2013.01)
(58) Field of Classification Search
  CPC .... H02M 1/08; H02M 1/0025; H02M 1/0032; H02M 1/0041; H02M 1/0006;

(Continued)

(56) References Cited

U.S. PATENT DOCUMENTS 11,005,367  B2   5/2021  Tarroboiro et al.
2006/0061343 A1*  3/2006  Lipcsei ................. H02M 3/156
                                               323/283

(Continued)

FOREIGN PATENT DOCUMENTS

CN      103178712 A    6/2013
CN      103683932 A    3/2014

(Continued)

OTHER PUBLICATIONS

International Search Report and Written Opinion for Application No. PCT/US2024/029544, mailed on Aug. 21, 2024, 11 pages.

(Continued)

*Primary Examiner* — Monica Lewis
*Assistant Examiner* — Jye-June Lee
(74) *Attorney, Agent, or Firm* — AP3 Law Firm PLLC

(57)          ABSTRACT

A control circuit is coupled to a power converter having an input voltage $V_{IN}$ and an output voltage $V_{OUT}$. The control circuit includes a capacitor connected between a current source and a ground. The current source is configured to charge the capacitor with a current $\alpha V_{IN}$ or $\alpha(V_{IN}-V_{OUT})$ when a pulse width modulate (PWM) signal of a PWM controller of the power converter is high, and to discharge the capacitor with a current $\alpha(-V_{OUT})$ or $\alpha(V_{IN}-V_{OUT})$ when the PWM signal is low. $\alpha$ is a pre-configured constant. The control circuit is configured to trigger the PWM controller to skip pulses when a voltage across the capacitor decreases to be less than a threshold before a present switching cycle of the power converter ends.

20 Claims, 8 Drawing Sheets

(58) Field of Classification Search

CPC ...... H02M 3/156; H02M 3/157; H02M 3/155; Y02B 70/10

See application file for complete search history.

(56) References Cited

U.S. PATENT DOCUMENTS

| | | | | | |
|---|---|---|---|---|---|
| 2010/0072968 | A1* | 3/2010 | Bianco | ................. | H02M 3/156 |
| | | | | | 323/284 |
| 2010/0301822 | A1* | 12/2010 | Chen | .................... | H02M 3/156 |
| | | | | | 323/283 |
| 2012/0268095 | A1* | 10/2012 | Wu | ...................... | H02M 3/156 |
| | | | | | 323/285 |
| 2014/0253080 | A1* | 9/2014 | Jiang | ................... | H02M 3/156 |
| | | | | | 323/284 |
| 2015/0084606 | A1* | 3/2015 | Nakamura | ........... | H02M 3/156 |
| | | | | | 323/246 |

FOREIGN PATENT DOCUMENTS

| | | | |
|---|---|---|---|
| CN | 106558983 | A | 4/2017 |
| CN | 106558985 | A | 4/2017 |
| CN | 111814305 | A | 10/2020 |
| JP | 2004194452 | A | 7/2004 |
| JP | 2007189800 | A | 7/2007 |
| JP | 2016187241 | A | 10/2016 |
| JP | 2021132514 | A | 9/2021 |
| JP | 2022552397 | A | 12/2022 |
| TW | 201914190 | A | 4/2019 |
| TW | 202308282 | A | 2/2023 |

OTHER PUBLICATIONS

Office Action and Search Report for Taiwan Patent Application No. 113108965, mailed Nov. 25, 2024, 6 pages.

Office Action for Japanese Patent Application No. 2024-096761, mailed Aug. 26, 2025, 9 pages.

\* cited by examiner

300

400

Buck Converter  210

500

SWITCHING MODE POWER CONVERTER WITH PULSE SKIPPING AND CONTROL METHOD THEREOF

TECHNICAL FIELD

The present disclosure relates generally to power supplies, and in particular embodiments, to techniques and mechanisms for switching mode power converters with pulse skipping and control methods thereof.

BACKGROUND

Switching mode power supplies, or switch mode power supplies, are widely used for providing a regulated output of power from an input power source, e.g., an input voltage. The regulation of the output power is typically provided by feeding back the output voltage of a switching mode power supply, based on which the input voltage is switched on and off by a controller, e.g., a pulse width modulate (PWM) controller. However, in a switching mode power supply, as the output load decreases, the proportion of the power consumed by the PWM controller to the total power consumption increases significantly, resulting in low efficiency when the output load is light. It is desirable to develop techniques and mechanisms for a switching mode power supply to provide more efficient power conversion at light load.

SUMMARY

Technical advantages are generally achieved, by embodiments of this disclosure which describe a switching mode power converter with pulse skipping and a control method thereof.

According to one aspect of the present disclosure, a circuit is provided that includes: a control circuit coupled to a power converter having an input voltage $V_{IN}$ and an output voltage $V_{OUT}$. The control circuit includes a current source, and a capacitor connected between the current source and a ground. The current source is configured to charge the capacitor with a current equal to $\alpha(V_{IN}-V_{OUT})$ when a pulse width modulate (PWM) signal of a PWM controller of the power converter is high, and to discharge the capacitor with a current equal to $\alpha(-V_{OUT})$ when the PWM signal of the PWM controller is low, a being a pre-configured constant. The control circuit is configured to trigger the PWM controller to skip pulses when a voltage across the capacitor decreases to be less than a skip threshold before a present switching cycle of the power converter ends.

According to another aspect of the present disclosure, a method for controlling a pulse width modulate (PWM) controller of a power converter to skip pulse(s) is provided. The method includes: in a switching cycle of the power converter, charging a capacitor with a current equal to $\alpha(V_{IN}-V_{OUT})$ when a PWM signal of the PWM controller is high, a being a pre-configured constant, and the power converter having an input voltage $V_{IN}$ and an output voltage $V_{OUT}$; discharging the capacitor with a current equal to $\alpha(-V_{OUT})$ when the PWM signal of the PWM controller is low; and when detecting that a voltage across the capacitor decreases to be less than a skip threshold before the switching cycle ends, triggering the PWM controller to skip pulse(s).

According to another aspect of the present disclosure, an apparatus is provided that includes: a power converter comprising a power switch and an inductor that are connected between an input node and an output node of the power converter, the input node having an input voltage $V_{IN}$ and the output node providing an output voltage $V_{OUT}$; a pulse width modulate (PWM) controller coupled to the power converter and configured to control the power converter to operate in a PWM mode; and a control circuit coupled to the PWM controller. The control circuit includes: a current source; and a capacitor connected between the current source and a ground, wherein the current source is configured to charge the capacitor with a current equal to $\alpha V_{IN}$ or $\alpha(V_{IN}-V_{OUT})$ when a PWM signal of the PWM controller is high, and to discharge the capacitor with a current equal to $\alpha(-V_{OUT})$ or $\alpha(V_{IN}-V_{OUT})$ when the PWM signal of the PWM controller is low, a being a pre-configured constant. The control circuit is configured to trigger the PWM controller to skip switching on the power switch for pulse(s) when a voltage at a common node of the current source and the capacitor decreases to be less than a skip threshold before a present switching cycle of the power converter ends.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. Further, one or more features from one or more of the following described embodiments may be combined to create alternative embodiments not explicitly described, and features suitable for such combinations are understood within the scope of this disclosure. It is therefore intended that the appended claims encompass any such modifications or embodiments.

Embodiments of the present disclosure are described in the following using a buck converter as an example. However, the embodiments of the present disclosure may be applied to various switching mode power supplies or converters that have an inductor or transformer.

Figure 1:
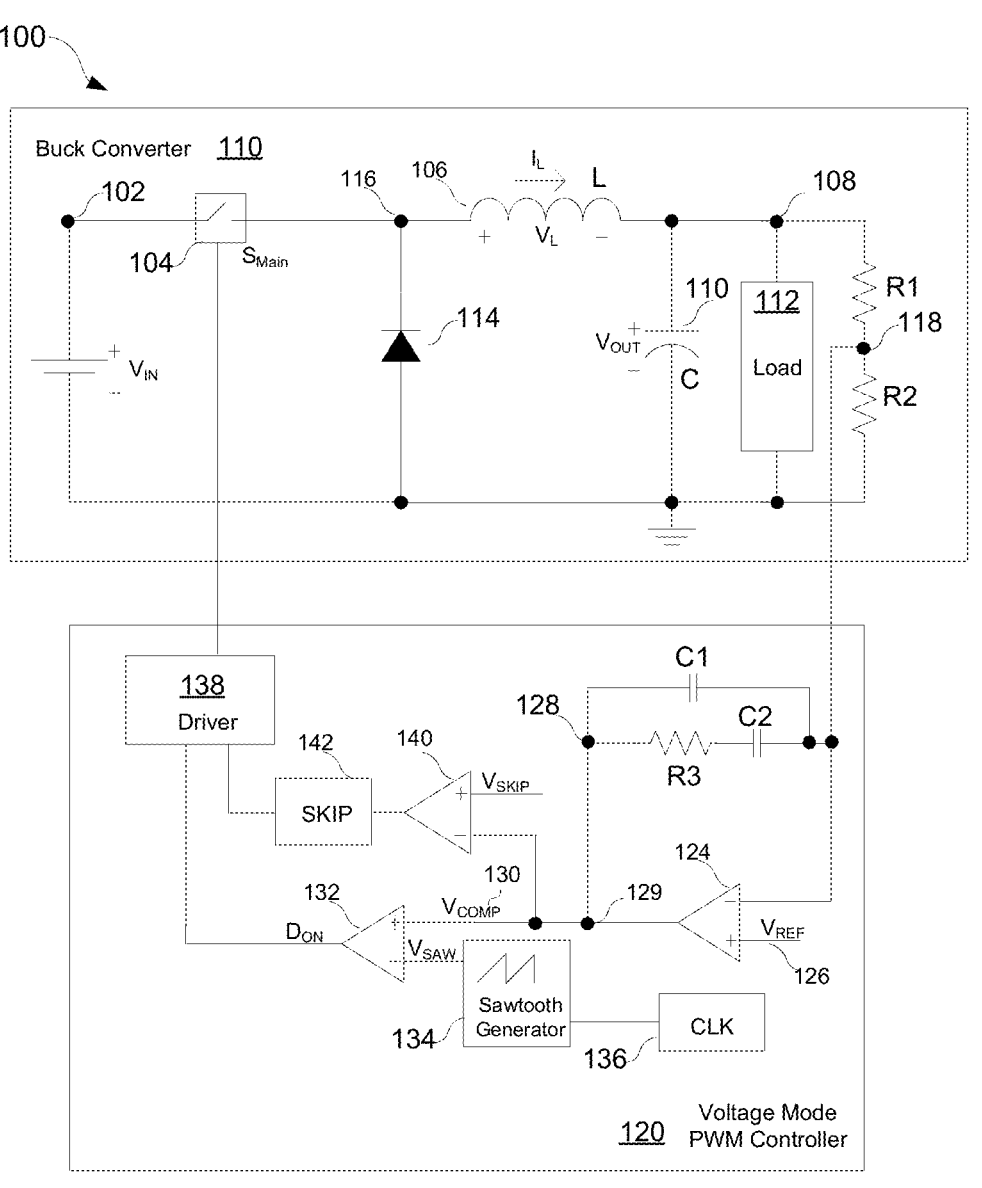
FIG. 1 is a schematic diagram of an example conventional switching mode power supply.

FIG. 1 is a schematic diagram of an example conventional switching mode power supply 100. The switching mode power supply 100 includes a buck converter 110 and a general voltage mode pulse width modulation (PWM) controller 120.

Buck converters are a type of switching mode power supplies. As known, a buck converter is a DC (direct current) to DC power converter which steps down voltage from an input voltage provided to its input terminal to an output voltage provided at its output terminal.

Regulated buck converters use a feedback to regulate the output voltage. In this example, the buck converter operates in voltage mode control, where the feedback is based on the output voltage.

As shown, the buck converter 110 includes an input terminal (or node) 102 that receives an input power source, e.g., input voltage $V_{IN}$, and an output terminal (node) 108 that outputs an output power, e.g., output voltage $V_{OUT}$, which supplies power to a load 112. The input terminal 102 is coupled to a power switch $S_{main}$ 104. An inductor 106 having an inductivity L is coupled between the power switch 104 and the output terminal 108. A capacitor 110 having a capacitance C is coupled between the output terminal 108 and ground. The load 112 is connected in parallel with the capacitor 110. A diode 114 is coupled between the ground and a common node 116 of the inductor 106 and the power switch 104.

The voltage mode PWM controller 120 is configured to receive feedback of the output voltage of the buck converter 110, and to control to switch on and off the power switch 104 based on the feedback. The flow of the input power into the output of the buck converter 110 can be controlled by turning on and off the power switch 104 periodically. To provide feedback, the output voltage $V_{OUT}$ at the output terminal 108 is divided by a resistor divider including resistors R1, R2 connected in series between the output terminal 108 and the ground. A common node 118 of the resistors R1, R2 is coupled to a first input terminal of an operational amplifier 124 and a compensation network. A second input terminal of the operational amplifier 124 is connected to a reference voltage ($V_{REF}$) 126. The compensation network is formed by a resistor R3 and capacitors C1 and C2. R3 and C2 are connected in series between the node 118 and a node 128. C1 is connected in parallel with the series-connected R3 and C2. The node 128 is connected to an output terminal 129 of the operational amplifier 124. The output signal of the compensation network and the output signal of the operational amplifier 124 is combined at the node 129 as a voltage signal $V_{COMP}$ 130 (also referred to as a control force signal) and is then delivered to a first input terminal of a comparator 132. A second input terminal of the comparator 132 is connected to a sawtooth generator 134, which generates sawtooth signals/waves based on a clock signal 136. An output terminal of the comparator 132 is connected to a driver 138, which generates a drive signal to turn on or off the power switch 104 based on the output signal $D_{ON}$ of the comparator 132. The output signal $D_{ON}$ of the comparator 132 may be referred to as a PWM signal, which controls on and off of the power switch 104.

In operation, the power switch 104 is repeatedly switched on and off in switching cycles with the on and off times governed by the voltage mode PWM controller 120. In PWM, the switching cycles have the same period, and the on time may be different in different switching cycles. These switching actions cause the input power to be delivered to the load with regulation. The combination of the inductor 106 and the capacitor 110 create an LC filter that serves to smooth out any ripple created by the switching actions. The on time (duty cycle) of the power switch 104 varies based on an error between the reference voltage $V_{REF}$ 126 and the output voltage feedback from the buck converter 110 so that the output voltage of the buck converter 110 stays within a desired range. The operation of the buck converter 110 is well known in the art and will not be described herein in more details.

In the switching mode power supply 100, as the output load decreases, the proportion of the power consumed by the PWM controller 120 relative to the total power consumption of the switching mode power supply 100 may increase significantly, as the voltage mode PWM controller 120 keeps generating drive signals to switch on and off the power switch 104 based on the fed-back output voltage of the buck converter 110. This results in low efficiency of the switching mode power supply 100 when operating with light output load.

To reduce the power consumption when the load is light, an existing method is to control the switching mode power supply 100 to operate in a pulse skipping mode. Specifically, a threshold voltage/signal $V_{SKIP}$ is configured and compared with the control force signal $V_{COMP}$ to determine whether to enter the pulse skipping mode. As shown in FIG. 1, the voltage mode PWM controller 120 may further include a comparator 140, with a first input terminal connected to the threshold voltage $V_{SKIP}$ and a second input terminal connected to the control force signal $V_{COMP}$. The output of the comparator 140 is connected to a skip circuit/module 142, which generates an output signal at an output terminal of the skip circuit/module 142 based on the output signal of the comparator 140. The output terminal of the skip circuit/module 142 is connected to the driver 138. The driver 138 is configured to determine whether to skip (switching) pulses based on the output signal from the skip circuit 142. The driver 138 may output a drive signal to switch off the power switch 104.

As the output load, e.g., the load 112, gradually decreases, the buck converter 110 transitions from the continuous conduction mode (CCM) to the discontinuous conduction mode (DCM). As known, in CCM, the current flows continuous in the inductor 106 during an entire switching cycle; while in DCM, the inductor current becomes zero for a portion of a switching cycle. When the buck converter 110 operates in DCM, the control force signal $V_{COMP}$ decreases along with the decreasing load. When the control force signal $V_{COMP}$ falls below the threshold voltage $V_{SKIP}$, the driver 138 may skip one or more switching pulses to reduce the power consumption of the voltage mode PWM controller 120 until $V_{COMP}$ is above $V_{SKIP}$. As an example, when $V_{COMP}$ falls below $V_{SKIP}$, the output of the comparator 140 goes high, which causes the skip module 142 to generate a skip signal indicating to skip pulses. Based on the skip signal, the driver 138 may then generate a drive signal to switch off the power switch 104, and skip switching on the power switch 104 for pulse(s). When $V_{COMP}$ exceeds $V_{SKIP}$, the output of the comparator 140 is low, based on which, the skip module 142 may not be triggered or may generate a no-skip signal (e.g., low). In this case, the driver 138 operates based on the output signal $D_{ON}$ as in normal cycles. It is readily apparent to those of ordinary skill in the art that there are various way to implement the pulse skipping circuit as set in FIG. 1.

Generally, in order to avoid affecting the normal operation in CCM, the threshold voltage $V_{SKIP}$ is typically set at a very low level, so the pulse skipping mode only occurs at extremely light output load. Thus, the existing method only allows pulse skipping for a very limited load range.

Embodiments of the present disclosure provide a mechanisms and apparatus that generally trigger pulse skipping to occur in discontinue conduction mode (DCM), and allow a PWM controller to skip pulse(s) over a wider range of output loads. In particular, embodiments of the present disclosure provide a mechanism for DCM detection and pulse skipping without the need of current sensing. Embodiments of the present disclosure eliminate the need to compare the output voltage feedback with the threshold voltage $V_{SKIP}$ to determine skipping switching pulses as employed by the existing technology, and greatly relieve the limitation on the load size required by the comparison.

In some embodiment, whether skipping switching pulses in DCM may be determined by monitoring the inductor current $I_L$ with a simulating signal $V_{SIM}$. In particular, according to the magnetizing/demagnetizing voltage across the inductor, a simulating inductor current signal $V_{SIM}$ proportional to the inductor current $I_L$ may be established. A PWM controller may be configured to skip pulse(s) when $V_{SIM}$ drops to zero along with the inductor current $I_L$ before the end of a switching cycle, which means that the buck converter operates in DCM.

Figure 2:
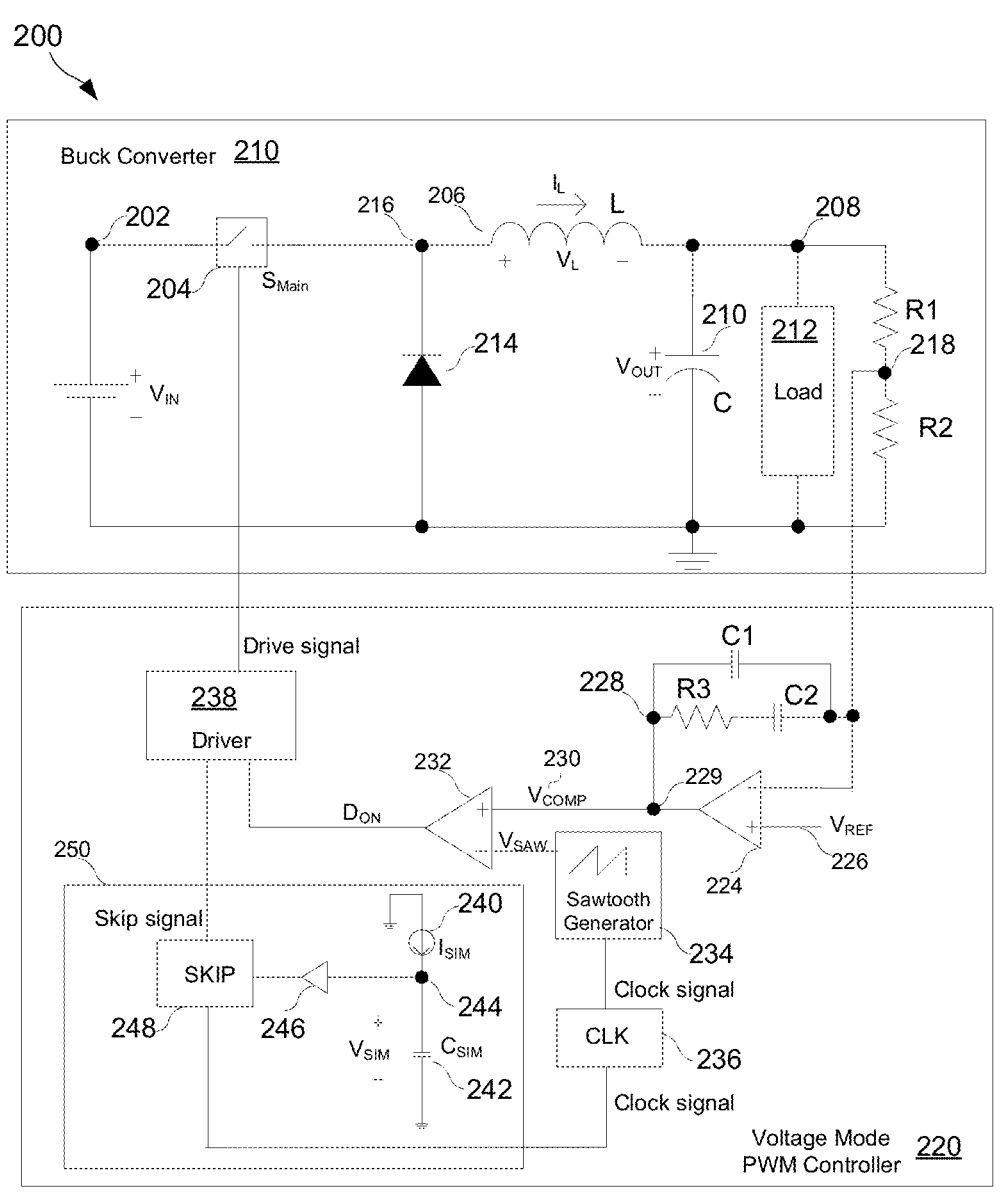
FIG. 2 is a schematic diagram of an example switching mode power supply according to embodiments of the present disclosure.

FIG. 2 is a schematic diagram of an example switching mode power supply 200 according to embodiments of the present disclosure. The switching mode power supply 200 includes a buck converter 210 and a general voltage mode pulse width modulation (PWM) controller 220.

The buck converter 210 is similar to the buck converter 110 in FIG. 1. As shown, the buck converter 210 includes an input terminal (or node) 202 that receives an input power source, e.g., input voltage $V_{IN}$, and an output terminal (or node) 208 that outputs an output power, e.g., output voltage $V_{OUT}$, which supplies power to a load 212. The input terminal 202 is coupled to a main switch (or power switch) $S_{main}$ 204. An inductor 206 having an inductivity L is coupled between the main switch 204 and the output terminal 208. A capacitor 210 having a capacitance C is coupled between the output terminal 208 and ground. The load 212 is connected in parallel with the capacitor 210. A diode 214 is coupled between the ground and a common node 216 of the inductor 206 and the main switch 204.

The main switch 204 may be a metal oxide semiconductor field-effect transistor (MOSFET) device, or any controllable switches, such as an insulated gate bipolar transistor (IGBT) device, an integrated gate commutated thyristor (IGCT) device, a gate turn-off thyristor (GTO) device, a silicon-controlled rectifier (SCR) device, a junction gate field-effect transistor (JFET) device, a MOS controlled thyristor (MCT) device, a gallium nitride (GaN) based power device, a silicon carbide (SiC) based power device and the like.

The voltage mode PWM controller 220 is configured to control the buck converter 210 to operate in the PWM mode. The voltage mode PWM controller 220 may be configured to control to switch on and off the main switch 204 based on the feedback voltage from the buck converter 210, and to skip pulses. To provide feedback, the output voltage $V_{OUT}$ at the output terminal 208 is divided by a resistor divider including resistors R1, R2 connected in series between the output terminal 208 and the ground. Note that the resistor divider illustrated in FIG. 2 is merely used as an example. Those of ordinary skill in the art would recognize many variations, alternatives and embodiments that can be used for the same purpose of the resistor divider in the example of FIG. 2. A common node 218 of the resistors R1, R2 is coupled to a first input terminal (negative terminal) of an operational amplifier 224 and a compensation network. A second input terminal (positive terminal) of the operational amplifier 224 is connected to a reference voltage ($V_{REF}$) 226. The compensation network is formed by a resistor R3 and capacitors C1 and C2. R3 and C2 are connected in series between the node 218 and a node 228. C1 is connected in parallel with the series-connected R3 and C2. The node 228 is connected to respective terminals of C1 and R3. The node 228 is connected to an output terminal 229 of the operational amplifier 224. The output signal of the compensation network and the output signal of the operational amplifier 224 is combined as a voltage signal $V_{COMP}$ 230 (also referred to as a control force signal), which is delivered to a first input terminal (positive) of a comparator 232. A second input terminal (negative) of the comparator 232 is connected to a sawtooth generator 234, which generates a sawtooth voltage signal $V_{SAW}$ based on a clock signal from a clock generator 236, and feeds the voltage signal $V_{SAW}$ to the second input terminal of the comparator 232. The clock signal serves as the switching frequency clock signal of the switching mode power supply 200. An output terminal of the comparator 232 is connected to a driver 238, which generates a drive signal to turn on or off the main switch 204 based on the output signal $D_{ON}$ of the comparator 232. The output signal $D_{ON}$ of the comparator 232 may be referred to as a PWM signal, which controls the buck converter to operate in a PWM mode. In an example, the switching frequency may be less than or equal to 425 KHz, e.g., 400 KHz. The terms of "output signal $D_{ON}$" and "PWM signal $D_{ON}$" will be used interchangeably in the present disclosure.

The voltage mode PWM controller 220 may further include a skip control circuit 250 including a voltage control current source 240, a capacitor $C_{SIM}$ 242, a buffer 246 and a skip circuit/module 248. To simulate the inductor current $I_L$ flowing through the inductor 206, in some embodiments, the voltage control current source 240 may be configured with a current $I_{SIM}=\alpha V_L$ to charge the capacitor $C_{SIM}$ 242, where $V_L$ is the voltage across the inductor 206, and a is a pre-configured constant. $\alpha$ may be configurable and is used to control the current amplitude of the voltage control current source 240.

As shown, the voltage control current source 240 and the capacitor $C_{SIM}$ 242 are connected in series, with a common node 246 of the voltage control current source 240 and the capacitor $C_{SIM}$ 242 being connected to an input terminal of the buffer 246. The capacitor $C_{SIM}$ 242 is connected between the node 244 and ground. An output terminal of the buffer 246 is connected to an input terminal of the skip circuit/module 248. An output node of the skip circuit/module 248 is connected to the driver 238. A skip signal may be generated/output at the output node of the skip circuit/module 248 based on the output signal of the buffer 246, i.e., the voltage $V_{SIM}$ across the capacitor $C_{SIM}$ 242.

The driver 238 is configured to determine whether to skip pulses based on the skip signal from the skip circuit 248.

When the skip signal is high, the driver 238 may output a drive signal switching off the power switch 204 for one or more pulses, i.e., the driver 238 may skip switching on the power switch 204 for one or more pulses. When the skip signal is low, the driver 238 operates according to the output signal $D_{ON}$ from the comparator 232. In some embodiments, the driver 238 may include a general purpose driver for driving on and off the power switch 204 and a circuit for determining whether to skip pulses. As an example, the circuit may include a logic circuit for detecting the skip signal and triggering the general purpose driver to drive the power switch 204 based on the detected skip signal. Those of ordinary skill in the art would recognize various ways to implement the driver 238 with functions as described in the embodiments of the present disclosure.

Figure 3:
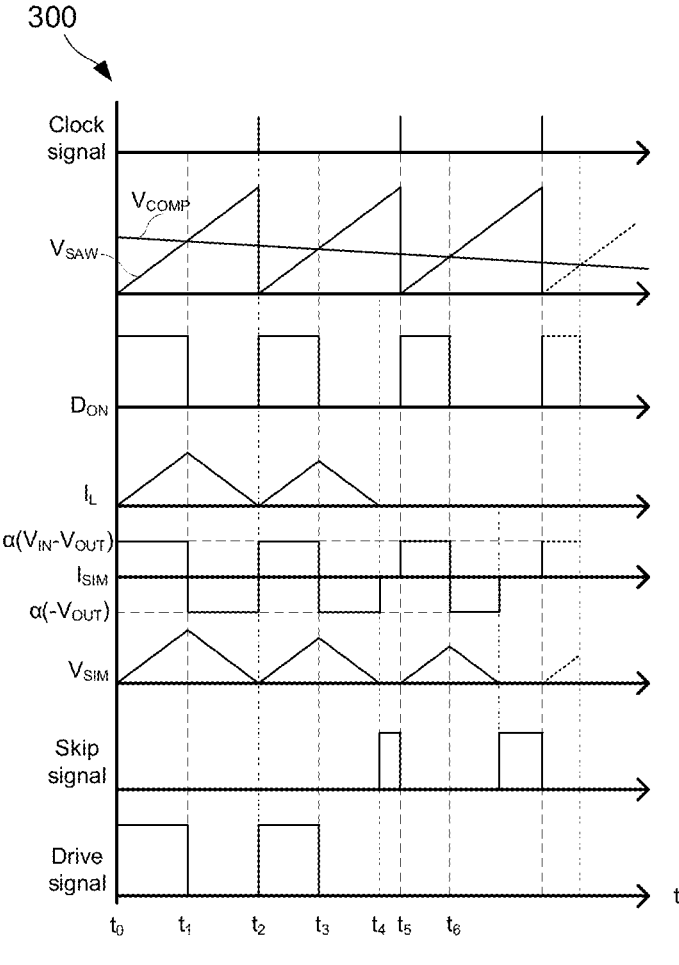
FIG. 3 is a diagram of example waveforms showing operation of the switching mode power supply of FIG. 2 according to embodiments of the present disclosure.

The operation of the switching mode power supply 200 is described in the following with reference to FIG. 2 and FIG. 3, using an example scenario where the load is decreasing gradually. FIG. 3 is a diagram 300 of example waveforms showing the operation of the switching mode power supply 200 according to embodiments of the present disclosure. FIG. 3 shows waveforms of the clock signal output by the clock generator 236, the voltage signal $V_{COMP}$ 230 at the first input terminal of the comparator 232 reflecting the feedback of the output voltage of the buck converter 210, the sawtooth voltage signal $V_{SAW}$ at the second input terminal of the comparator 232, the output signal $D_{ON}$ of the comparator 232, the current $I_L$ flowing through the inductor 206, $I_{SIM}$ of the voltage control current source 240, $V_{SIM}$ across the capacitor $C_{SIM}$ 242, the skip signal output by the skip module 248, and the drive signal output by the driver 238 for controlling the main switch 204.

During the time interval t0~t2 (e.g., a first switching cycle), the buck converter 210 operates in CCM. The operation of the Buck converter 210 in this switching cycle is well known and will not be described herein.

At t2, the next switching cycle (t2~t5) starts. During the time interval t2~t3, the control force signal $V_{COMP}$ 230 is greater than $V_{SAW}$, and the PWM signal $D_{ON}$ of the comparator 232 goes high, based on which, the driver 238 drives the main switch $S_{MAIN}$ 204 to turn on. In this case, the diode 214 is reverse biased, and the voltage $V_L$ across the inductor 206 is $V_L=(V_{IN}-V_{OUT})$, which magnetizes the inductor 206, and the current $I_L$ through the inductor 206 increases. At the meantime, the voltage control current source 240 has $I_{SIM}=\alpha V_L=\alpha(V_{IN}-V_{OUT})$, which charges the capacitor $C_{SIM}$ 242. Thus, when the PWM signal $D_{ON}$ goes high, the voltage control current source 240 charges the capacitor $C_{SIM}$ 242 with a current $\alpha(V_{IN}-V_{OUT})$. The voltage $V_{SIM}$ across the capacitor $C_{SIM}$ 242 consequently goes up along with the current $I_L$ of the inductor 206.

During the time interval t3~44, the $V_{COMP}$ 230 is lower than $V_{SAW}$, and the PWM signal $D_{ON}$ of the comparator 232 goes low, based on which the driver 238 turns off the main switch $S_{MAIN}$ 204. In this case, the voltage $V_L$ across the inductor is $V_L=-V_{OUT}$, which demagnetizes the inductor 206, and the current $I_L$ thus decreases. At the meantime, the voltage control current source 240 has $I_{SIM}=\alpha V_L=\alpha(-V_{OUT})$, which discharges the capacitor $C_{SIM}$ 242, and thus the voltage $V_{SIM}$ across the capacitor $C_{SIM}$ 242 falls along with $I_L$. Thus, when the PWM signal $D_{ON}$ goes low, the voltage control current source 240 discharges the capacitor $C_{SIM}$ 242 with a current $\alpha(-V_{OUT})$.

At time t4, $V_{SIM}$ falls to zero along with the decrease of the current $I_L$ before the switching frequency clock signal nocks in, i.e., before the next switching cycle starts, or before the present switching cycle ends. The buck converter

210 then enters into DCM, and the skip signal output by the skip 248 transfers to high, which causes the driver 238 to stop switching. The skip signal may be initially set to be low. The switching mode power supply 200 enters the pulse skipping mode. The skip signal remains high until at t5, when the switching frequency clock signal nocks in, which resets the skip signal to be low. A new switching cycle starts from t5. During the width of the skip signal pulse, $V_{SIM}$ and $I_{SIM}$ remain to be zero, and are reset by the clock signal when the new switching cycle starts at t5, where $I_{SIM}$ has a value based on $V_{IN}$ and $V_{OUT}$, and the capacitor $C_{SIM}$ continues to be charged and discharged by $I_{SIM}$. When entering the pulse skipping mode, the drive signal will remain to be low (the main switch 204 stays off), and $I_L$ will remain zero (0) even after the new switching cycle starts. The driver 238 may skip switching on the main switch 204 for one or more pulses. In this example, as the load continues to decrease in the new switching cycle starting at t5, the skip module 248 will continue to generate a high skip signal triggered by $V_{SIM}$ falling to zero as shown in FIG. 3. The switching mode power supply 200 may exit the pulse skipping mode when the buck converter enters CCM.

Based on the voltage-second balance theory, the inductor current $I_L$ only falls to zero before the end of the switching period in DCM. That means that only the alternating current (AC) ripple of the inductor current $I_L$ needs to be simulated without the DC offset.

Figure 4:
FIG. 4 is a schematic diagram of another example switching mode power supply according to embodiments of the present disclosure.

Furthermore, the magnetizing and demagnetizing voltage $V_L$ across the inductor 206 is always related to the input voltage $V_{IN}$ and the output voltage $V_{OUT}$, i.e., $V_L=(V_{IN}-V_{OUT})$ or $V_L=-V_{OUT}$. Therefore, in some embodiments, the voltage control current source 240 having $I_{SIM}$ may be implemented by using two constant current sources having current $\alpha V_{IN}$ and $\alpha V_{OUT}$, respectively. FIG. 4 illustrates an example of such implementation according to embodiments of the present disclosure.

FIG. 4 is a schematic diagram of an example switching mode power supply 400 according to embodiments of the present disclosure. The switching mode power supply 400 includes the buck converter 210 and the general voltage mode PWM controller 220 as described with respect to FIG. 2, but with the skip control circuit 250 implemented differently. Description of the buck converter 210 and the general voltage mode PWM controller 220 other than the skip control circuit 250 has been provided above with respect to FIGS. 2 and 3, and will not be repeated herein.

In this example of FIG. 4, the skip control circuit 250 includes a first constant current source 252 having a current $I_C=\alpha V_{IN}$, and a second constant current source 254 having a current $I_D=\alpha V_{OUT}$. The first constant current source 252 is connected to a first switch S1 in series between ground and a node 256. The second constant current source 254, the capacitor 242 and a second switch S2 are connected in parallel with each other between the node 256 and the ground. The first switch S1 is turned on and off under the control of the output signal $D_{ON}$ of the comparator 232. The second switch S2 is turned on and off under the control of the clock signal from the clock generator 236. The node 256 is connected to the skip circuit/module 248. The skip circuit/module 248 is configured to generate/output the skip signal based on the signal at the node 256, and is reset based on the clock signal.

Figure 5:
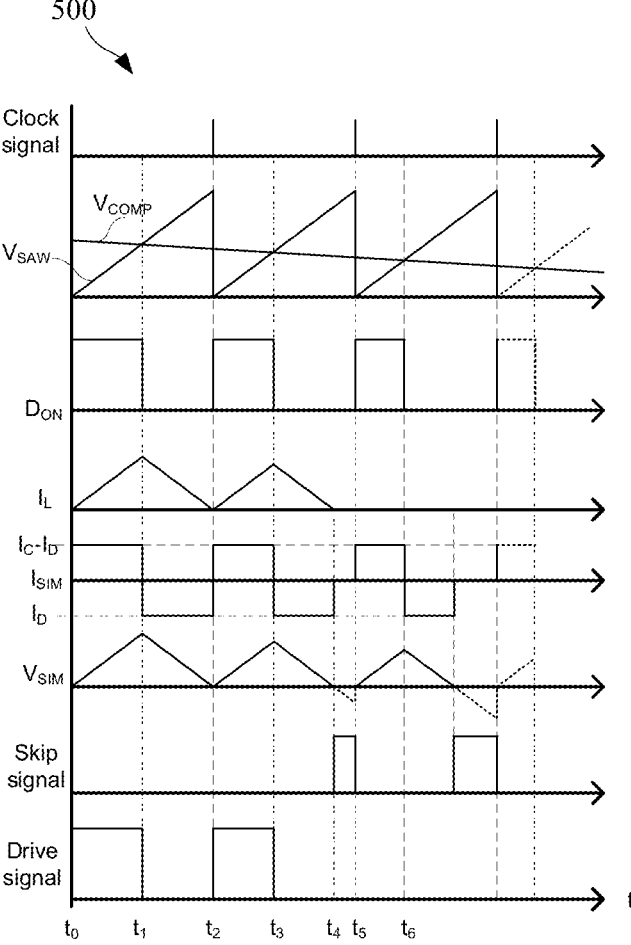
FIG. 5 is a diagram of example waveforms showing operation of the switching mode power supply of FIG. 4 according to embodiments of the present disclosure.

Operation of the switching mode power supply 400 will be described in the following with reference to FIG. 4 and FIG. 5, using an example scenario where the load is decreasing gradually. FIG. 5 is a diagram 500 of example waveforms showing the operation of the switching mode power supply 400 according embodiments of the present disclosure. FIG. 5 shows waveforms of the clock signal output by the clock generator 236, the voltage signal $V_{COMP}$ 230 at the first input terminal of the comparator 232 reflecting the feedback of the output voltage $V_{OUT}$ of the buck converter 210, the sawtooth voltage signal $V_{SAW}$ at the second input terminal of the comparator 232, the output signal $D_{ON}$ of the comparator 232, the current $I_L$ flowing through the inductor 206, the current $I_{SIM}$ flowing through the capacitor $C_{SIM}$ 242, the voltage $V_{SIM}$ across the capacitor $C_{SIM}$ 242, the skip signal output by the skip module 248, and the drive signal output by the driver 238 to control the main switch 204.

During the time interval t0~t2 (e.g., a first switching cycle), the buck converter 210 operates in CCM. At t2, the next switching cycle (t2~t5) starts. During the time interval t2~t3, the control force signal $V_{COMP}$ 230 is greater than $V_{SAW}$, and thus the PWM signal $D_{ON}$ of the comparator 232 goes high, based on which, the driver 238 drives the main switch $S_{MAIN}$ 204 to turn on. In this case, the voltage across the inductor is $V_L = (V_{IN} - V_{OUT})$, which magnetizes the inductor 206, and the current $I_L$ through the inductor 206 increases. At the meantime, the PWM signal $D_{ON}$ being high also turns on the first switch S1, and the current through the capacitor $C_{SIM}$ 242 is $I_{SIM} = \alpha V_L = \alpha(V_{IN} - V_{OUT}) = I_C - I_D$. The current $I_{SIM}$ charges the capacitor $C_{SIM}$ 242 during the period when the PWM signal $D_{ON}$ is high, and thus the voltage $V_{SIM}$ across the capacitor $C_{SIM}$ 242 increases along with the current $I_L$ of the inductor 206.

During the time interval t3~44, the $V_{COMP}$ 230 is lower than $V_{SAW}$, and thus the PWM signal $D_{ON}$ of the comparator 232 goes low, based on which the driver 238 turns off the main switch $S_{MAIN}$ 204. In this case, the voltage across the inductor is $V_L = -V_{OUT}$, which demagnetizes the inductor 206, and the current $I_L$ thus decreases. At the meantime, the PWM signal $D_{ON}$ being low causes the first switch S1 to turn off, and the current through the capacitor $C_{SIM}$ 242 becomes $I_{SIM} = \alpha V_L = \alpha(-V_{OUT}) = (-I_D)$, which discharges the capacitor $C_{SIM}$ 242, and the voltage $V_{SIM}$ across the capacitor $C_{SIM}$ 242 falls along with $I_L$. Thus, when the PWM signal $D_{ON}$ goes low, the current source $I_D$ 254 discharges the capacitor $C_{SIM}$ 242.

At t4, $V_{SIM}$ falls to zero before the switching frequency clock signal nocks in (i.e., before the present switching cycle ends). The buck converter 210 enters into DCM, and the skip signal output by the skip 248 transfers to high, which causes the driver 238 to stop switching. The drive signal output by the driver 238 goes low and switches off the main switch 204. The switching mode power supply 400 enters the pulse skipping mode. $V_{SIM}$ may be zero during the time interval t4~t5. In some cases, $V_{SIM}$ may fall below zero during the time interval t4~t5, as shown by the dashed lines in FIG. 5. At t5, the switching frequency clock signal nocks in, which resets the $V_{SIM}$ (e.g., to zero) and the skip signal (e.g., to low or zero), and starts a new switching cycle. When the switching frequency clock signal nocks in, the second switch S2 is switched on to cause the voltage $V_{SIM}$ to become zero. This ensures that $V_{SIM}$ starts from zero when a new switching cycle starts. The second switch S2 is then switched off after the new switching cycle starts. That is, second switch S2 is turned on and then off triggered by the clock signal at the beginning of each switching cycle.

Generally, the first switch S1 and the second switch S2 are not turned on simultaneously at start of a new switching cycle. The time when the second switch S2 is turned on may be configured such that the voltage $V_{SIM}$ is reset to zero and the charging of the capacitor $C_{SIM}$ at the beginning of the next switching cycle starts with $V_{SIM} = 0$. Ideally, the first switch S1 is turned on when the second switch is turned off by the clock signal. In reality, the second switch S2 may be configured to be turned on and off at least before the first switch S1 is turned on. In the example of FIG. 4 and FIG. 5, the second switch S2 is triggered directly by a next clock signal, and the first switch S1 is turned on by the PWM signal $D_{ON}$ becoming high, which is the result of comparing $V_{COMP}$ and $V_{SAW}$ triggered by the next clock signal. Thus, in this example, when the next clock signal nocks in, the second switch S2 would be turned on before the first switch S is turned on by the PWM signal $D_{ON}$.

Considering the imperfection of the circuit in reality, in some embodiments, a mechanism may be provided to cause the second switch S2 to turn on and off before the first switch S1 is turned on for the next switching cycle. As an example, the second switch S2 may be turned on and off in the present switching cycle when $V_{SAW}$ increases to be greater than or equal to a sawtooth voltage threshold, where the sawtooth voltage threshold is less than the peak value of $V_{SAW}$. That is, the second switch S2 is turned on and off before the present switching cycle ends. The sawtooth voltage threshold may be configured such that the second switch S2 is turned on and off when the present switching cycle is approaching its end, e.g., between t4 and t5. As an example, the sawtooth voltage threshold may be set to be 95% of the peak value of $V_{SAW}$. As another example, a second clock signal may be introduced, which has the same period as the clock signal (referred to as a first clock signal) of the clock generator 236, but starts earlier than the first clock signal in each cycle. The second clock signal may be used to specifically trigger the on and off of the second switch S2. Those of ordinary skill in the art would recognize various implementations for the same purpose as described herein.

The skip circuit/module 248 is configured to generate/output a skip signal based on $V_{SIM}$. In some embodiments, the skip signal may be initialized to be low or zero. The skip signal may be set to high indicating to skip pulse(s), as shown in the examples of FIGS. 2-5, when the skip circuit/module 248 detects that $V_{SIM}$ drops to zero (0) before the end of the current switching cycle, i.e., before the next switching cycle starts. In some embodiments, the skip circuit/module 248 may compare (e.g., with a comparator) $V_{SIM}$ with a threshold voltage $V_{THR}$, where $V_{THR}$ is set to be zero (0). When $V_{SIM}$ decreases to reach $V_{THR}$, the skip circuit/module 248 is triggered to output a high skip signal indicating pulse skipping. It would be apparent to those of ordinary skill in the art that the skip circuit/module 248 may be implemented in various ways for the same purposes as described in the embodiments of the present disclosure.

In reality, a circuit may not operate ideally. For example, $V_{SIM}$ may not be able to drop to zero. In some embodiments, the threshold voltage $V_{THR}$ may be set to have a value higher than 0 or lower than 0, e.g., $V_{THR} = 50$ mv. The skip module 248 may be configured to output a skip signal when detecting that $V_{SIM} \leq V_{THR}$. The value of the threshold voltage $V_{THR}$ may be configurable depending on the application of the switching mode power supply 200 or 400. It may be 0, a positive number or a negative number. In this non-ideal scenario, the use of the second switch S2 enables $V_{SIM}$ to start from zero in each switching cycle.

Figure 6:
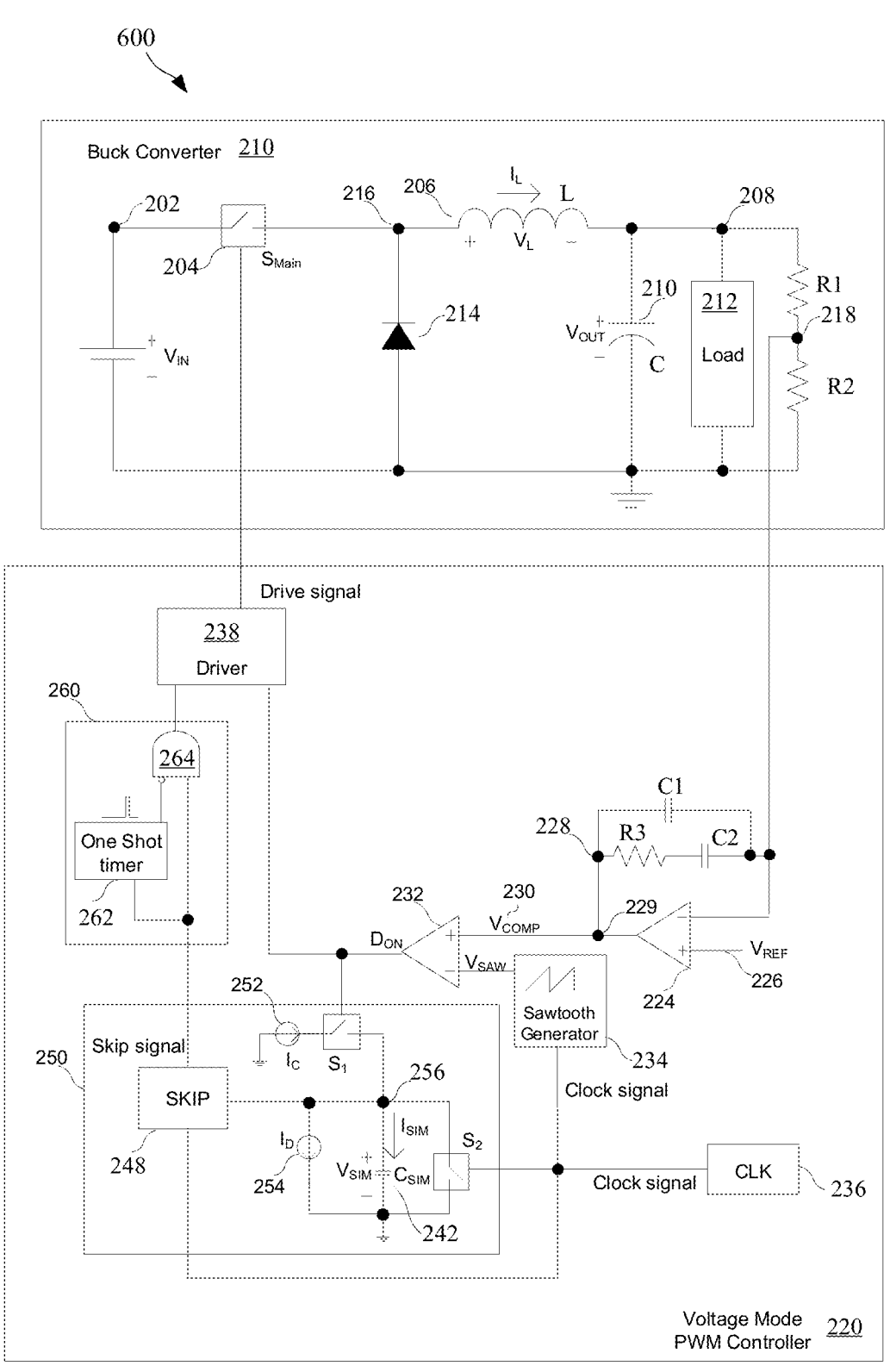
FIG. 6 is a schematic diagram of another example switching mode power supply according to embodiments of the present disclosure.

In view of the non-ideal scenario, and to avoid the pulse skipping mode is activated when the switching mode power supply operates in CCM, in some embodiments, a delay circuit 260 may be connected between the skip module 248 and the driver 238, as shown in FIG. 6, to delay skipping switching. FIG. 6 is a schematic diagram of an example switching mode power supply 600 according to embodiments of the present disclosure. The switching mode power supply 600 includes the buck converter 210 and the general voltage mode PWM controller 220 as described with respect to FIG. 4, but with the delay circuit 260 added. The delay circuit 260 includes a one shot timer 262 and an AND logic gate 264. The one shot timer 262 is connected between a first input terminal of the AND logic gate 264 and the skip module 248. An output signal of the one shot timer 262 is fed to the first input terminal of the AND logic gate 264, and the output signal is then inverted and fed to the AND logic gate 264. A second input terminal of the AND logic gate 264 is connected to the skip module 248. An output terminal of the AND logic gate 264 is connected to the driver 238. The output of the one shot timer In some embodiments, when the skip signal transfers to high, the one shot timer 262 may be triggered to turn high and start counting based on a preset time T. The preset time T may be determined based on the switching frequency of the switching mode power supply 600. As an example, the switching frequency is f=400 KHz, and the preset time T may be set to be 100 nanosecond (i.e., T=1/f×4%). When the one shot timer 262 has finished counting, it's output may turn low, which is then inverted at the first input terminal of the AND gate 264 and fed to the AND gate 264. Thus, the input at the first input terminal of the AND gate 264 is high. The skip signal being high is also delivered to the second input terminal of the AND gate 264, and thus the input at the second input terminal of the AND gate 264 is high. As a result, the output of the AND logic gate 264 is high. At this time, if the clock has not nocked in, i.e., if the present switching cycle has not ended, the driver 238 controls the main switch 204 to skip pulses based on the output of the AND logic gate 264 being high. If the present switching cycle ends or has ended (the next switching cycle has started) when the one shot timer 262 finishes counting, the driver 238 may be configured to not skip pulses. As an example, when the driver 238 receives an output signal from the AND logic gate 264 that is high, the driver 238 may detect whether the next clock signal starts or whether the present switching cycle has ended, and based thereon, determine whether to skip pulses. The driver 238 may include a circuit for implementing these functions, which would be readily apparent to those of ordinary skill in the art.

In an example, when the skip signal goes high, the one shot timer 262 may be triggered to generate a pulse with a width of T. The one shot timer 262 starts timing at the rising edge of the pulse, and the timing continues during the width of the pulse. The output of the one shot timer 262 is high before the one shot timer 262 expires, and is fed to the AND logic gate 264 with its value inverted. Thus, the input at the first input terminal of the AND logic gate 264 is low, the input (the skip signal) at the second input terminal of the AND logic gate 264 is high, and therefore, the output of the AND logic gate 264 is low, which does not trigger the pulse skipping. At the falling edge of the pulse, the one shot timer 262 stops timing. The output of the one shot timer 262 goes low, the input at the first input terminal of the AND logic gate 264 therefore goes high (the output of the one shot timer 262 being high is inverted), the input (the skip signal) at the second input terminal of the AND logic gate 264 is high, and thus the output of the AND logic gate 264 goes high, based on which, in combination with the clock signal, the driver 238 determines whether to skip pulses. Thus, when $V_{SIM}$ decreases and reach $V_{THR}$, the delay provided by the delay circuit 260 allows time for the voltage mode PWM controller 220 to avoid skip pulses when operating in CCM.

Although the skip control circuit 250 and the delay circuit 260 are shown to be part of the general voltage mode PWM controller 220, they may be separate circuits from the voltage mode PWM controller 220. One or more circuits and/or components as described above may be implemented as integrated circuits. One or more features of the above embodiments may be combined, altered, or modified to generate other embodiments, which belong to the scope of the present disclosure. For example, the delay circuit may be added to the switching mode power supply 200 of FIG. 2 as described with respect to FIG. 6. Those of ordinary skill in the art would also recognize that there are various way to implement the voltage mode PWM controller 220 to control the buck converter 210 to operate in the PWM mode.

Figure 7:
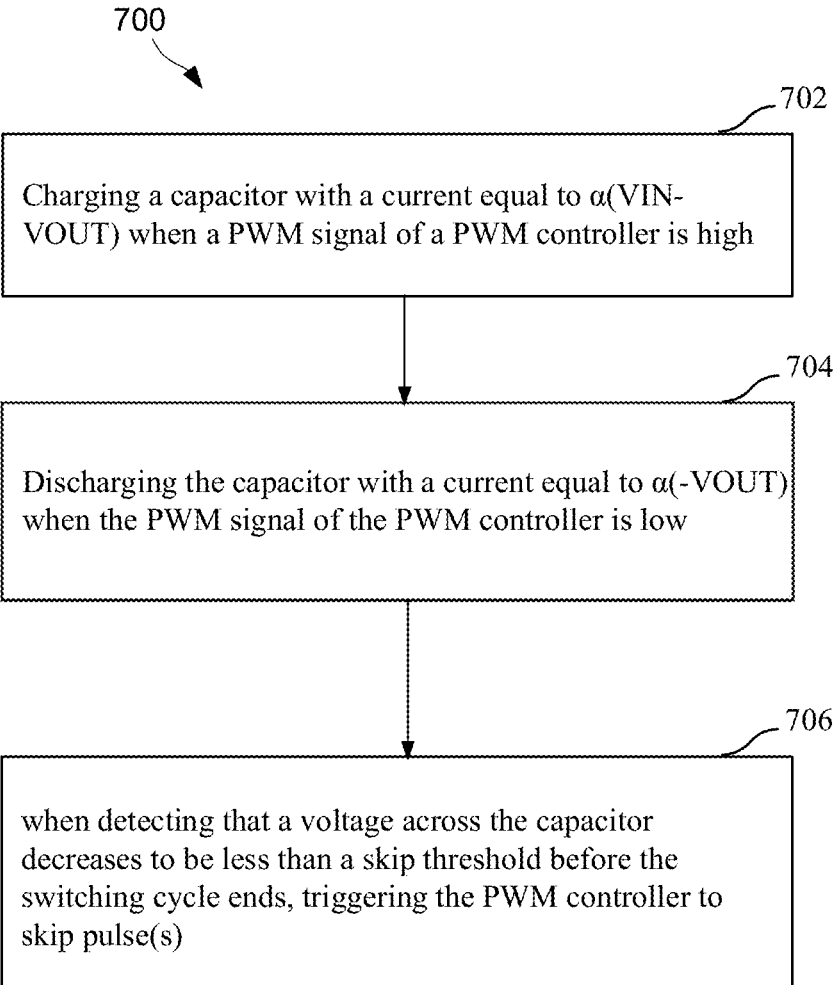
FIG. 7 is a flowchart of an example method for controlling a pulse width modulate (PWM) controller of a power converter to skip pulses according to embodiments of the present disclosure.

FIG. 7 is a flowchart of an example method 700 for controlling a PWM controller of a power converter to skip pulses according to embodiments of the present disclosure. The method may be indicative of operations performed at a switching mode power supply in a switching cycle. The switching mode power supply may include a power converter having an input voltage $V_{IN}$ and an output voltage $V_{OUT}$, and a PWM controller. As shown, the method 700 may include charging a capacitor with a current equal to $\alpha(V_{IN}-V_{OUT})$ when a PWM signal of the PWM controller is high, where a is a pre-configured constant (step 702). The method 700 may further include discharging the capacitor with a current equal to $\alpha(-V_{OUT})$ when the PWM signal of the PWM controller is low (step 704). The method 700 may also include: when detecting that a voltage across the capacitor decreases to be less than a skip threshold before the switching cycle ends, triggering the PWM controller to skip pulse(s) (step 706). The method 700 may be implemented by the above described embodiments.

Figure 8:
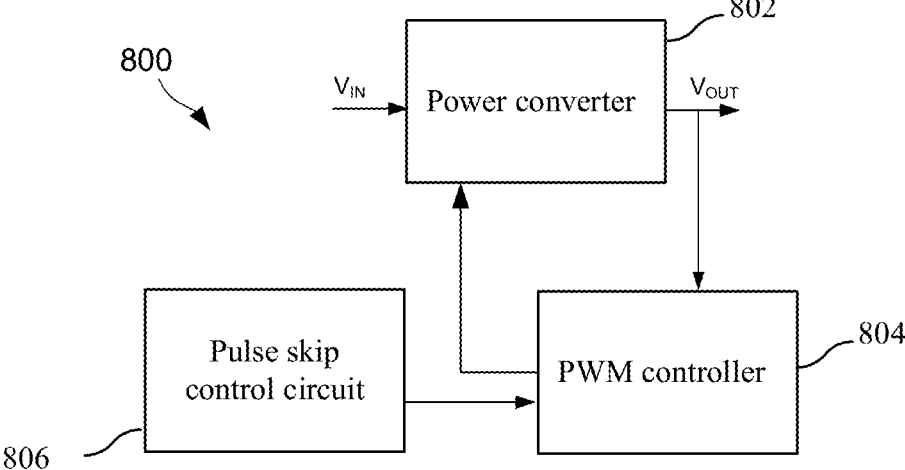
FIG. 8 is an example apparatus according to embodiments of the present disclosure.

FIG. 8 is a block diagram of an apparatus 800 according to embodiments of the present disclosure. The apparatus 800 incudes a power converter 802, a PWM controller 804 connected to the power converter 802, and a pulse skip control circuit 806 connected to the PWM controller 804. The power converter 802 may include an input node having an input voltage $V_{IN}$ and an output node providing an output voltage $V_{OUT}$, which may supply power to a load. The power converter 802 may be a switching mode power converter including a power switch and an inductor or a transformer that are connected in series between the input node and the output node. For example, the power converter 802 is a buck converter. The PWM controller 804 may be configured to control the power converter 802 to operate in a PWM mode, based on a feedback of the output voltage from the power converter 802. The PWM controller 804 may have a structure as known in the art or developed in future that serves the similar function.

The pulse skip control circuit 806 is configured to trigger the PWM controller 804 to skip switching on the power converter 802 for one or more pulses. As an example, the pulse skip control circuit 806 may include a current source, and a capacitor connected between the current source and a ground. The current source is configured to charge the capacitor with a current equal to $\alpha(V_{IN}-V_{OUT})$ when a PWM signal of the PWM controller 804 is high, and to discharge the capacitor with a current equal to $\alpha(-V_{OUT})$ when the PWM signal of the PWM controller is low, where a is a pre-configured constant. The PWM signal of the PWM controller is generated by the PWM controller 804 that is used for driving the power converter 802. The pulse skip control circuit 806 is configured to trigger the PWM controller 804 to skip pulse(s) when a voltage at a common node of the current source and the capacitor decreases to be less than a skip threshold before a present switching cycle ends. The pulse skip control circuit 806 may be similar to the skip control circuit 250 in FIG. 2 or FIG. 4.

Although the above embodiment circuits and methods are described using a buck converter as an example, other power converters are also applicable. For example, the embodiment may be applied to a buck-boost converter, or a boost converter. For a buck-boost converter as an example, the inductor is magnetized by a voltage $V_L=V_{IN}$, and demagnetized by a voltage $V_L=(-V_{OUT})$. Thus, the voltage control current source 240 may be configured with a current $I_{SIM}=\alpha V_L=\alpha V_{IN}$ to charge the capacitor $C_{SIM}$ 242, and with a current $I_{SIM}=\alpha V_L=\alpha(-V_{OUT})$ to discharge the capacitor $C_{SIM}$ 242. For a boost converter as an example, the inductor is magnetized by a voltage $V_L=V_{IN}$, and demagnetized by a voltage $V_L=(V_{IN}-V_{OUT})$. Thus, in this case, the voltage control current source 240 may be configured with a current $I_{SIM}=\alpha V_L=\alpha V_{IN}$ to charge the capacitor $C_{SIM}$ 242, and with a current $I_{SIM}=\alpha V_L=\alpha(V_{IN}-V_{OUT})$ to discharge the capacitor $C_{SIM}$ 242. The voltage control current source 240 may be configured similarly for other power converters.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, Compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A circuit comprising:
a control circuit coupled to a power converter having an input voltage $V_{IN}$ and an output voltage $V_{OUT}$, the control circuit comprising:
a current source; and
a capacitor connected between the current source and a ground, wherein the current source is configured to charge the capacitor with a current equal to $\alpha(V_{IN}-V_{OUT})$ when a pulse width modulate (PWM) signal of a PWM controller of the power converter is high, and to discharge the capacitor with a current equal to $\alpha(-V_{OUT})$ when the PWM signal of the PWM controller is low, $\alpha$ being a pre-configured constant; and
wherein the control circuit is configured to trigger the PWM controller to skip pulse(s) when a voltage across the capacitor decreases, during discharging of the capacitor by the current source, to be less than a skip threshold before a present switching cycle of the power converter ends.

2. The circuit of claim 1, wherein the current source comprises:
a first current source having a current $\alpha V_{IN}$, the first current source being connected to a first terminal of the capacitor with a current flowing direction of the first current source from the first current source to the capacitor; and
a second current source having a current $\alpha V_{OUT}$, the second current source being connected between the first terminal of the capacitor and the ground, with a current flowing direction of the second current source from the first terminal of the capacitor to the ground, and the second current source being connected in parallel with the capacitor.

3. The circuit of claim 2, wherein the control circuit further comprises a first switch connected between the first current source and the first terminal of the capacitor, the first switch being configured to switch on when the PWM signal is high.

4. The circuit of claim 2, wherein the control circuit further comprises a second switch connected between the first terminal of the capacitor and the ground in parallel with the capacitor, the second switch being configured to set the voltage across the capacitor to zero.

5. The circuit of claim 1, wherein the control circuit further comprises:
a skip circuit having an input terminal connected to a first terminal of the capacitor, the skip circuit being configured to output a skip signal indicating to skip switching pulse(s) when the voltage across the capacitor decreases to be less than the skip threshold before the present switching cycle ends.

6. The circuit of claim 5, further comprising:
a driver connected between the power converter and the skip circuit, the driver being configured to control, based on the skip signal, to skip switching on a power switch of the power converter for pulse(s).

7. The circuit of claim 6, further comprising a delay circuit connected between the skip circuit and the driver, the delay circuit comprising:
an AND gate having a first input terminal connected to an output terminal of the skip circuit, and an output terminal connected to the driver; and
a one shot timer having an input terminal connected to the output terminal of the skip circuit, and an output terminal connected to a second input terminal of the AND gate, with an input at the second input terminal of the AND gate inverted; and
wherein the one shot timer is triggered, by the skip signal, to start timing according to a preset time, and the driver is configured to skip switching on the power switch for pulse(s) when the one shot timer expires before the present switching cycle ends.

8. The circuit of claim 1, wherein the skip threshold is zero, or is greater than zero.

9. A method for controlling a pulse width modulate (PWM) controller of a power converter to skip pulse(s), comprising: in a switching cycle of the power converter,
charging a capacitor with a current equal to $\alpha(V_{IN}-V_{OUT})$ when a PWM signal of the PWM controller is high, $\alpha$ being a pre-configured constant, and the power converter having an input voltage $V_{IN}$ and an output voltage $V_{OUT}$;
discharging the capacitor with a current equal to $\alpha(-V_{OUT})$ when the PWM signal of the PWM controller is low; and
when detecting that a voltage across the capacitor decreases, during discharging of the capacitor, to be less than a skip threshold before the switching cycle ends, triggering the PWM controller to skip pulse(s).

10. The method of claim 9, further comprising:
generating a skip signal indicating to skip pulses when detecting that the voltage across the capacitor decreases to be less than the skip threshold before the switching cycle ends.

11. The method of claim 10, further comprising:

triggering, based on the skip signal, the PWM controller to skip switching on a power switch of the power converter for pulse(s).

12. The method of claim 11, wherein triggering, based on the skip signal, the PWM controller to skip switching on the power switch for pulse(s) comprises:

triggering a driver of the PWM controller to drive the power switch to skip pulse(s).

13. The method of claim 10, further comprising:

starting a one shot timer triggered by the skip signal; and wherein triggering the PWM controller to skip pulse(s) comprises:

triggering the PWM controller to skip pulse(s) when the one shot timer expires before the switching cycle ends.

14. The method of claim 10, further comprising:

resetting the skip signal at start of a next switching cycle.

15. The method of claim 9, further comprising:

setting the voltage across the capacitor to zero at or before start of a next switching cycle.

16. An apparatus comprising:

a power converter comprising a power switch and an inductor that are connected between an input node and an output node of the power converter, the input node having an input voltage $V_{IN}$ and the output node providing an output voltage $V_{OUT}$;

a pulse width modulate (PWM) controller coupled to the power converter and configured to control the power converter to operate in a PWM mode; and a control circuit coupled to the PWM controller, the control circuit comprising:

a current source; and a capacitor connected between the current source and a ground, wherein the current source is configured to charge the capacitor with a current equal to $\alpha V_{IN}$ or $\alpha(V_{IN}-V_{OUT})$ when a PWM signal of the PWM controller is high, and to discharge the capacitor with a current equal to $\alpha(-V_{OUT})$ or $\alpha(V_{IN}-V_{OUT})$ when the PWM signal of the PWM controller is low, $\alpha$ being a pre-configured constant; and wherein the control circuit is configured to trigger the PWM controller to skip switching on the power switch for pulse(s) when a voltage at a common node of the current source and the capacitor decreases, during discharging of the capacitor, to be less than a skip threshold before a present switching cycle of the power converter ends.

17. The apparatus of claim 16, wherein the current source comprises:

a first current source having a current $\alpha V_{IN}$, the first current source being connected between the common node and the ground with a current flowing direction of the first current source being from the first current source to the common node; and a second current source having a current $\alpha V_{OUT}$, the second current source being connected between the common node and the ground with a current flowing direction of the second current source being from the common node to the ground, and the second current source being connected in parallel with the capacitor.

18. The apparatus of claim 17, wherein the control circuit further comprises a first switch connected between the first current source and the common node, the first switch being configured to switch on when the PWM signal is high.

19. The apparatus of claim 17, wherein the control circuit further comprises a second switch connected between the common node and the ground in parallel with the capacitor, the second switch being configured to set a voltage across the capacitor to zero.

20. The apparatus of claim 16, wherein the control circuit further comprises:

a skip circuit having an input terminal connected to the common node, the skip circuit being configured to output a skip signal indicating to skip switching pulse(s) when a voltage across the capacitor decreases to be less than the skip threshold before the present switching cycle ends.

\* \* \* \* \*